United States Patent Office 2,846,273
Patented Aug. 5, 1958

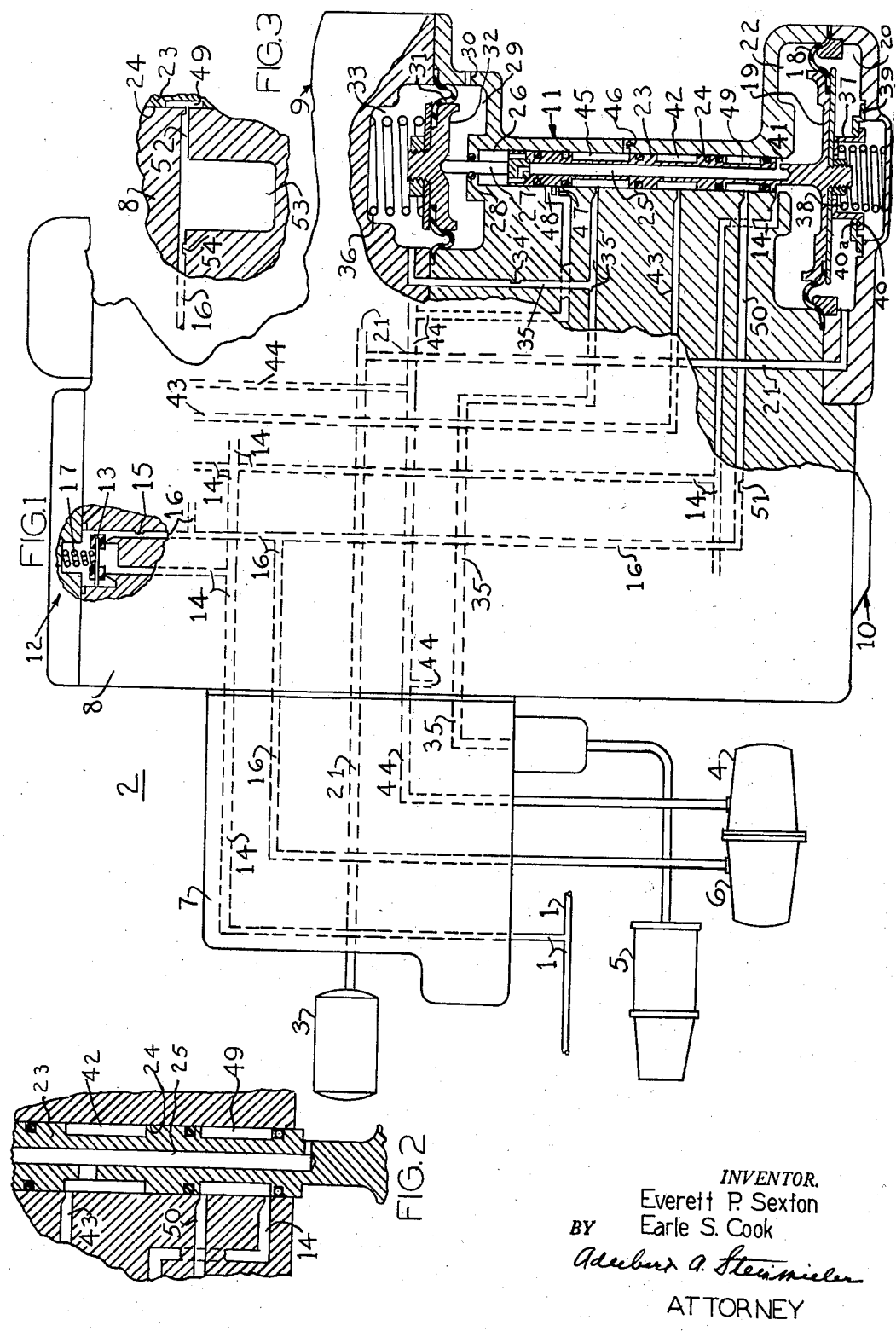

2,846,273

FLUID PRESSURE BRAKE APPARATUS

Everett P. Sexton, East McKeesport, and Earle S. Cook, Forest Hills, Pa., assignors to Westinghouse Air Brake Company, Wilmerding, Pa., a corporation of Pennsylvania Application July 29, 1954, Serial No. 446,514

8 Claims. (Cl. 303—66)

This invention relates to fluid pressure brake apparatus and more particularly to the graduated release type in which the degree of brake application and release is controlled according to the extent of reduction and restoration, respectively, in pressure of fluid in a brake pipe relative to a datum pressure in a control reservoir.

In the copending application of Earle S. Cook, Serial No. 439,706, filed June 28, 1954, and assigned to the assignee of the present application, there is disclosed a graduated release type brake control apparatus in which the main or service valve device embodies a diaphragm stack subject to brake pipe pressure and to pressure of fluid in a brake cylinder device, both of which act in opposition to a substantially constant pressure of fluid in a control reservoir. Upon any degree of reduction in pressure in the brake pipe up to a chosen degree, the control reservoir pressure actuates the diaphragm stack to supply fluid under pressure from an auxiliary reservoir to the brake cylinder device for applying brakes until the brake cylinder pressure is increased to a degree proportionate to the reduction in brake pipe pressure; whereupon the service valve device assumes a lap position for bottling up fluid under pressure in said brake cylinder device. Upon a reduction in brake pipe pressure in excess of the chosen degree, an emergency reservoir is also connected to the brake cylinder device to provide a higher pressure in the brake cylinder device for emergency braking. To release the brakes, the brake pipe pressure is increased or restored, either in steps or completely in a continuous manner, by operation of the usual engineer's brake valve device for effecting operation of the service valve devices in a train to cause either a graduated release of brakes or a single step, continuous complete release of brakes, respectively.

Where, as in the apparatus just described, fluid under pressure for increasing the brake pipe pressure throughout the train is supplied solely at the locomotive by operation of the engineer's brake valve device, it will be apparent that due to the length of the brake pipe and to resistance to flow of fluid under pressure therethrough, the initiation of a brake release on the rear cars of the train will be delayed with respect to release of brakes on the front cars of the train, whereas it is desirable that the brakes on all cars throughout the train be released as nearly simultaneously as possible.

One object of the invention therefore is the provision of improved means for causing the brakes on the cars at the rear of a train to start releasing sooner after initiating the release of brakes on the first car of the train, in order to obtain a more nearly uniform and synchronous release of brakes throughout the train than heretofore possible with brake apparatus of this general type.

According to this object, the service valve device is provided with means operative in response to an increase in brake pipe pressure, to cause a local pressure increase in the brake pipe independently of the engineer's brake valve device and of such degree as to cause the next service valve device to the rear in a train to operate to cause a similar local increase in brake pipe pressure. Hence, an increase in brake pipe pressure initiated by operation of the engineer's brake valve device on the locomotive will cause serial operation of all of the service valve devices in the train to locally increase brake pipe pressure and initiate a release of brakes on the respective cars. Thus, the wave of pressure increase in the brake pipe initiated by the engineer's brake valve device and locally reinforced on each car and transmitted to the next car to the rear in the train will travel through the train at an accelerated rate approaching the speed of sound, which is very desirable.

Another object is to provide an improved brake apparatus of the above general type embodying means for more rapidly propagating a brake releasing pressure increase wave throughout the length of a train of cars equipped with such apparatus for more uniformly initiating either a single step or graduated release of the brakes on all such cars.

Other objects and advantages will become apparent from the following more detailed description of the invention and from the accompanying drawing, wherein Fig. 1 is a diagrammatic view of a portion of a brake apparatus embodying the invention; Fig. 2 is an enlarged, fragmentary, sectional view of a portion of the apparatus shown in Fig. 1; and Fig. 3 is a fragmentary diagrammatic view of a modified portion of the apparatus shown in Fig. 1.

Description

Since the novel structure is adapted for use with fluid pressure brake apparatus which may, for sake of illustration, be of the type shown and described in the aforementioned copending application, the disclosure in the accompanying drawing and in the following description has been limited to only such structure as is essential to a clear understanding of the present invention.

Referring to Fig. 1 of the drawing, the brake apparatus comprises the usual brake pipe 1 which is adapted to extend through the train and in which pressure of fluid is adapted to be varied in the well-known manner by manual operation of the usual engineer's automatic brake valve device (not shown) provided on the locomotive.

On each brake-equipped car of the train there is provided a brake controlling valve device 2, which is adapted to respond to a reduction in pressure of fluid in the brake pipe 1 to any value between normal operating value and a certain lower value, relative to a datum pressure in a control reservoir 3, for supplying fluid at a corresponding pressure from an auxiliary reservoir 4 to a brake cylinder device 5 for thereby effecting a corresponding degree of service application of the brakes on the respective car; said valve device being adapted to respond to a reduction in brake pipe pressure to or below a chosen value, substantially lower than said certain value, for supplying fluid under pressure to said brake cylinder device from an emergency reservoir 6 as well as from the auxiliary reservoir 4; and said valve device being adapted to respond to any degree of increase in brake pipe pressure relative to the datum pressure in said control reservoir for releasing fluid under pressure to a proportionate degree from the brake cylinder device 5 and, at some time (not pertinent to the present invention) after said brake cylinder device is devoid of such fluid, opening the auxiliary reservoir 4 and control reservoir 3 to the brake pipe 1 for permitting said reservoirs to become charged from the brake pipe to the normal pressure carried therein, in the manner described in the aforementioned copending application.

The brake controlling valve device 2 comprises a pipe bracket 7 to which are adapted to be connected the control reservoir 3, auxiliary reservoir 4, brake cylinder device 5, emergency reservoir 6, and a branch of the brake pipe 1; and on one face of said pipe bracket is mounted a sectionalized casing 8.

The brake controlling valve device 2 also comprises a charging valve device 9, which may be identical with that disclosed in the aforementioned copending application, for opening a fluid pressure communication whereby pressure in the brake pipe 1 equalizes into the control reservoir 3 and auxiliary reservoir 4 when the brakes on the respective car are fully released and for closing said communication at all other times; a quick service valve device 10, which may also be identical with that described in the aforementioned copending application and which is adapted to respond to a slight reduction in brake pipe pressure for locally effecting on each car a further, quick service reduction in brake pipe pressure for thereby increasing the rate of propagation of the brake actuating pressure reduction wave rearward through a train to the next brake-equipped car in the train; a graduated control or service valve device 11 for controlling supply of fluid under pressure to, and release of the same from, the brake cylinder device 5 and also controlling initial recharging of the auxiliary reservoir 4 from the brake pipe 1, in the manner described in said copending application, as well as for other reasons hereinafter to be described; and an emergency reservoir charging check valve device 12 comprising a check valve 13 interposed between a passage 14 open to the brake pipe 1 and a choke 15 at one end of a passage 16 which leads to the emergency reservoir 6, said check valve being adapted to permit flow of fluid under pressure from the brake pipe to said emergency reservoir for charging said reservoir at the rate controlled by said choke, but biased by a helical spring 17 to a seated position for preventing flow in the reverse direction.

The service valve device 11 preferably comprises a flexible diaphragm 18 which is clamped adjacent its outer peripheral edge between sections of the casing 8 and is suitably clamped adjacent its inner peripheral edge between portions of a diaphragm follower 19. The diaphragm 18 is subject at one side to fluid pressure in a chamber 20 that is constantly open to the control reservoir 3 by way of passage 21; and said diaphragm is subject at the opposite side to fluid pressure in a chamber 22 which is open to a branch of the brake pipe passage 14 except under a certain condition hereinafter to be described. Preferably formed integrally with one of the portions of the follower 19 is a combination follower stem and valve, hereinafter to be referred to as slide valve 23, which extends through chamber 22 and projects into an aligned bore 24 in the casing; said slide valve having slidable, sealing engagement with the wall of said bore. The slide valve 23 has an internal passageway 25 which constantly connects the chamber 22 with a chamber 26, defined by the base and surrounding wall of the bore 24 and the projecting end of said slide valve, such that opposing fluid pressures acting on the diaphragm 18 will be effective on equal areas thereof. At its projecting end, the slide valve 23 is adapted to engage a coaxially aligned stem 27 which has slidable, sealing engagement with the wall of a bore through a casing partition 28 separating chamber 26 from a chamber 29 that is open to atmosphere via a port 30. A flexible diaphragm 31, clamped adjacent its outer peripheral edge between the portions of the casing and adjacent its inner peripheral edge between portions of a follower 32, separates atmospheric chamber 29 from a chamber 33 which is open to the brake cylinder device 5 by way of the usual dampening choke 34 and a passage 35. A helical bias spring 36, disposed in chamber 33 and acting on the follower 32, urges the diaphragm 31 in the direction of chamber 29 for thereby causing said follower to engage the stem 27 and, through such engagement, to urge the slide valve 23 to a normal or release position, in which it is shown in Fig. 1 of the drawing, and which position will be assumed under certain conditions hereinafter to be described.

The release position of slide valve 23 is defined by abutting engagement of the follower 19 with one end of a coaxially arranged spring support 37, which retains a helical spring 38 disposed in chamber 20; said spring support being slidable within a central bore through a spring support guide 39 that is suitably attached to the casing adjacent said chamber 20; and said spring support, with slide valve 23 in release position, being stopped at the limit of its movement in the direction of chamber 22 by engagement of an outwardly directed, radial flange 40 on said support with a partially overlying radial flange 40a formed on the guide 39 in encirclement of said bore. As noted in the aforementioned copending application, the value of spring 38 is greater than that of spring 36, and hence normally the follower 19 merely engages the spring support 37 and does not compress the spring 38.

With the slide valve 23 in release position, an elongated annular groove 41, formed in said slide valve adjacent follower 19 and constantly open to the chamber 22 and to passageway 25, is in registry with a branch of brake pipe passage 14 constantly open to the brake pipe 1; an elongated annular groove or cavity 42, formed in said slide valve and constantly open to the passageway 25, is in registry with a passage 43, between which and a passage 44 that is constantly open to the auxiliary reservoir 4 is interposed the usual series arranged, auxiliary reservoir charging check valve and choke (neither of which are shown because not pertinent to the invention), provided for the reasons fully described in the aforementioned copending application; an elongated annular groove or cavity 45, also formed in said slide valve, connects a branch of the brake cylinder passage 35 with a brake cylinder release choke 46; and said slide valve laps off a restricted port 47 and a port 48, both of which are constantly open to a branch of the auxiliary reservoir passage 44, the port 47 opening through the wall of bore 24 at a point intermediate the port 48 and passage 35, for reasons explained in the aforementioned copending application and not pertinent to the present invention.

The structure as thus far described is operative in exactly the same manner as more fully described in the aforementioned copending application. Thus, upon a reduction in pressure in the brake pipe 1 and hence in chamber 22 of the service valve device 11, the diaphragm 18 will be deflected by control reservoir pressure in chamber 20 for shifting the slide valve 23 to an application position in which cavity 45 is disconnected from the brake cylinder release choke 46 and connects the ports 47, 48 to the brake cylinder passage 35, so that fluid under pressure from the auxiliary reservoir 4 will flow via ports 47, 48 and passage 35 to the brake cylinder device 5 for applying brakes. During such flow to the brake cylinder device 5, fluid under pressure will also flow via a branch of passage 35 and at the rate controlled by choke 34 to the chamber 33 of service valve device 11; and when the brake cylinder pressure in said chamber has increased to an extent corresponding to the selected degree of reduction in brake pipe pressure, the diaphragm 31 will be deflected and, through the medium of follower 32 and stem 27, cause the slide valve 23 to be shifted to a lap position, against resistance of the net effect of preponderant fluid pressure in chamber 20 over that in chamber 22 acting on diaphragm 18. With the slide valve 23 in lap position, cavity 45 is out of registry with the ports 47, 48 and also with the brake cylinder release choke 46, for causing fluid to be bottled up in the brake cylinder device 5 at the desired pressure.

Upon a subsequent increase in brake pipe pressure, as initiated at the locomotive by operation of the aforementioned engineer's automatic brake valve device, a wave of pressure increase will flow rearward from the locomotive through the brake pipe 1 on the cars of the train, diminishing somewhat in degree or intensity due to frictional resistance to such flow and dissipation in the brake controlling valve devices 2 on the respective cars. In a car at the head of a train, the brake pipe pressure as noted in chamber 22 of the service valve device 11 on such car will be increased at least a certain degree, such as .7 p. s. i. and cause the corresponding diaphragm 18 to deflect against resistance of spring 38 for shifting the slide valve 23 to a retarded recharge position, defined by engagement of the follower 19 with the flange 40a of the spring support guide 39. With the slide valve 23 in this position, the brake pipe passage 14 will be disconnected from the chamber 22 for preventing a further increase in pressure in said chamber so as to prevent flow of fluid under pressure from the brake pipe 1 to the auxiliary reservoir 4 by way of an auxiliary reservoir recharge communication defined by the chamber 22, passageway 25, cavity 42, passage 43, the aforementioned auxiliary reservoir charging check valve and choke, and the auxiliary reservoir passage 44, for thereby desirably preventing a local drain on the brake pipe and thus providing more promptly a higher brake pipe pressure in the cars toward the rear of the train than would otherwise be obtained. And also with slide valve 23 in retarded recharge position, the cavity 45 will connect the brake cylinder passage 35 to the brake cylinder release choke 46 for permitting release of fluid under pressure from the brake cylinder device 5 at the rate controlled by said choke and also at the same time from chamber 33 of the service valve device 11. When the brake cylinder pressure in chamber 33 has thus been reduced a sufficient degree, the diaphragm 18 will be deflected by the preponderant effect of spring 38 and control reservoir pressure in chamber 20 for shifting the slide valve 23 to release position for establishing the auxiliary reservoir recharge communication just as described, while at the same time permitting brake cylinder pressure to continue to be released via passage 35, cavity 45, and choke 46; it being noted that the rate at which brake cylinder pressure is released via choke 46 indirectly controls the effective rate of charging of the auxiliary reservoir 4 by way of said communication since any tendency to charge at a faster rate will result in movement of the slide valve 23 back to retarded recharge position in which such communication is closed.

In a car toward the rear of a long train, however, the increase in brake pipe pressure, as noted in the chamber 22 of the service valve device 11 on such car, will generally be insufficient to cause deflection of the diaphragm 18 against resistance of the spring 38, and consequently the slide valve 23 on such car will merely be shifted to release position, for releasing fluid under pressure from the corresponding brake cylinder device 5, and also permitting fluid under pressure to flow from the brake pipe 1 to the auxiliary reservoir recharge communication, as will be understood from previous description.

It will of course be understood that in the case of a partial release of the brakes, the slide valves 23 on the respective cars will be shifted to lap position as soon as brake cylinder pressure in the corresponding chambers 33 has been reduced to a degree corresponding to the chosen degree of increase in brake pipe pressure as noted in the corresponding chambers 22; whereas in the case of a single step or continuous full release of brakes, the slide valves 23 on the respective cars, once having been shifted to normal position, will tend to remain in normal position since brake pipe pressure in the corresponding chambers 22 can increase at a faster rate than brake cylinder pressure in the corresponding brake cylinder devices 5 can be reduced at the rate controlled by the respective brake cylinder release chokes 46.

With the structure as thus far described, it will be noted that a partial or complete release of brakes throughout the train is not only initiated, but is actually effected, by supplying fluid under pressure to the brake pipe 1 solely at the locomotive, through operation of the aforementioned engineer's brake valve device. It is desirable, however, that the brake controlling valve devices 2 be provided with means operative, whenever the device 2 on any car responds to an increase in brake pipe pressure, to cause a local, further increase in brake pipe pressure, independently of the aforementioned engineer's brake valve device and of such degree to cause the next device 2 to the rear in a train to operate to cause a similar local increase in brake pipe pressure, for thereby causing serial operation of all of the brake controlling valve devices in the train to locally increase brake pipe pressure, so that when a wave of pressure increase in the brake pipe 1 is initiated by operation of the aforementioned engineer's brake valve device, said wave will be locally reinforced on each car and transmitted to the next car to the rear in the train, with the result that said wave will travel throughout the train at an accelerated rate approaching the speed of sound, for more rapidly and uniformly initiating a release of brakes throughout the train than heretofore possible with a brake apparatus of the above general type.

To this end, and according to the two embodiments of the invention as shown in Figs. 1 and 3 of the drawing, respectively, the source of fluid under pressure used for locally increasing brake pipe pressure may, for sake of illustration, be the emergency reservoir 6, although it will be understood that in a brake apparatus not provided with an emergency reservoir, such source may be a supplemental reservoir or chamber charged from the brake pipe 1 through a check valve device similar to the device 12.

According to the first embodiment of the invention and as shown in Fig. 1 of the drawing, the slide valve 23 of the service valve device 11 is provided with an annular groove or cavity 49 formed intermediate the groove 41 and cavity 42 and so disposed as to connect a passage 50 to a branch of brake pipe passage 14 only when said slide valve is in its previously defined retarded recharge position, in which it is shown in Fig. 2 of the drawing. The passage 50 is constantly open by way of a choke 51 and a branch of passage 16 to the emergency reservoir 6; the flow capacity of choke 51 having a definite relation to that of the brake cylinder release choke 46, as will be explained subsequently.

When by movement of the handle of the aforementioned engineer's brake valve device to a release position, a wave of pressure increase is initiated in the brake pipe 1 at the locomotive for causing a partial or complete release of brakes throughout the train, the consequent increase in brake pipe pressure as noted in the chamber 22 of the service valve device 11 on the first car of the train will cause the slide valve 23 on said car to be shifted to retarded recharge position, as will be understood from previous description. During movement of this slide valve 23 to retarded recharge position, the brake pipe passage 14 will be successively disconnected from the chamber 22 and then connected via cavity 49 to the passage 50, for permitting fluid under pressure from the emergency reservoir 6 to flow via passage 16, and at the rate controlled by choke 51, through passage 50, cavity 49 and brake pipe passage 14 to the brake pipe 1 for thereby effecting a local boost in brake pipe pressure. This boost in brake pipe pressure, as noted in the chamber 22 of the service valve device 11 on the next brake-equipped car to the rear in the train, will be sufficient to cause the corresponding slide valve 23 to be shifted to retarded recharge position for effecting a similar local boost in brake pipe pressure on said car, etc., with the result that the service valve devices 11 on the successive cars toward the rear of the train will be serially actuated to retarded recharge position, for causing each such device 11 to operate, in turn, to locally reinforce the wave of pressure increase and thus desirably accelerate the rate at which said wave is propagated through the train, for thereby obtaining a more nearly simultaneous initiation of the brake release of the cars throughout the train.

After pressure in the brake cylinder device 5 and hence in chamber 33 of the service valve device 11 on a particular car has reduced sufficiently by flow via the brake cylinder release choke 46, in the manner previously described, the corresponding slide valve 23 will be shifted from retarded recharge position toward or to release position for successively cutting off passage 50 from the brake pipe to limit the degree of such local increase in brake pipe pressure and then permitting fluid under pressure in the brake pipe 1 to flow from the corresponding brake pipe passage 14 to the chamber 22 and previously defined auxiliary reservoir recharge communication, as well as continuing to release brake cylinder pressure by way of choke 46.

It will now be understood that the period of time that the slide valve 23 remains in retarded recharge position is determined by the rate at which brake cylinder pressure is released via the release choke 46, for only when brake cylinder pressure in chamber 33 has been reduced to a degree sufficient to cause movement of the diaphragm stack will the slide valve 23 be shifted from retarded recharge position toward or to release position; hence the flow capacity of choke 51 is so related to that of the choke 46 as to cause a local increase in brake pipe pressure of a chosen small degree, such as 2 p. s. i., during said period. This chosen degree of local increase in brake pipe pressure is preferably sufficient to assure serial actuation of the service valve devices 11 on the respective cars to retarded recharge position, in the manner previously described, without causing an undue increase in pressure in the brake pipe 1 throughout the entire length of the train, for thereby desirably permitting brake cylinder pressure to be reduced in small increments or step reductions, the magnitude of such step reductions being determined not only by said chosen degree of local increase in brake pipe pressure but also by the ratio of the areas of the diaphragms 18, 31. Hence if the area of diaphragm 18 is illustratively assumed to be 2.5 times that of diaphragm 31, and the chosen degree of local increase in brake pipe pressure is assumed to be 2 p. s. i., brake cylinder pressure may be reduced in steps or increments of 5 p. s. i.

Thus, if the engineer desires to limit the degree of brake release to a chosen degree and accordingly has moved the handle of the aforementioned engineer's brake valve device to a lap position for maintaining pressure in the brake pipe at a corresponding desired reduced pressure, the slide valve 23 of each service valve device 11 will be shifted to lap position when a corresponding step of reduction in brake cylinder pressure has been obtained. If, however, the handle of the engineer's brake valve device is allowed to remain in release position and thus supply fluid under pressure to the brake pipe 1 for restoring brake pipe pressure to normal operating value, then the slide valves 23 of the respective service valve devices 11, after initial movement to retarded recharge position and subsequent movement to release position, as already described, will remain in release position because of such continuing supply of fluid under pressure to the brake pipe 1 and hence to the respective chamber 22, for thereby permitting a continuous and complete release of brakes to be obtained.

According to the second embodiment of the invention, as shown in Fig. 3 of the drawing, the slide valve 23 of the service valve device 11 is provided with the groove 49, as already described; however, the structure differs from that shown in Fig. 1 of the drawing in that the groove 49 connects a passage 52 with the usual branch of the brake pipe passage 14 when said slide valve is in retarded recharge position; said passage 52 being open by way of a volume or chamber 53 and a choke 54 to the emergency reservoir passage 16, so that the volume 53 may be charged with fluid under pressure from the emergency reservoir 6 at the rate controlled by said choke.

Thus when, after the initiation of a wave of pressure increase in the brake pipe 1 at the locomotive, the slide valve 23 of the service valve device 11 on a particular car is shifted to retarded recharge position in the manner heretofore described, a metered volume of fluid under pressure previously stored in the volume 53 will be dumped into the corresponding brake pipe passage 14 for promptly effecting a local increase in brake pipe pressure on said car of a degree corresponding to the chosen capacity of said volume 53, which capacity, in turn, is great enough to effect a sufficient local increase in brake pipe pressure to assure serial operation of the service valve device 11 on the next brake-equipped car toward the rear of the train, yet small enough to limit the extent of such local increase for permitting brake cylinder pressure to be reduced in small increments, which is desirable for the reasons hereinabove described. Since, as previously noted, the period of time the slide valve 23 remains in retarded recharge position before being shifted, by operation of the diaphragm stack, to release position is controlled by the rate at which brake cylinder pressure is released via the brake cylinder release choke 46, the flow capacity of choke 54 is so related to that of the choke 46 as to limit the rate of flow of fluid under pressure from the emergency reservoir 6 to the volume 53 for thereby preventing any appreciable further increase in brake pipe pressure after fluid under pressure has been dumped into the brake pipe 1 from the volume 53.

In all other respects the second embodiment of the invention is similar in structure and operation to the first embodiment thereof, as shown in Fig. 1 of the drawing and heretofore described.

*Summary*

It will now be seen that, according to both embodiments of the invention, novel means are provided for use with a brake controlling valve device 2 on a railway car; said means being responsive to an increase in brake pipe pressure at said car to cause a local boost in brake pipe pressure of such degree as to assure operation of the brake controlling valve device 2 on the next car toward the rear in a train for causing a similar, local boost in brake pipe pressure, such that if a wave of pressure increase in the brake pipe 1 is initiated at the locomotive by operation of the engineer's brake valve device, said wave will be locally reinforced on each successive car by operation, in serial relation, of the valve device 2 on the corresponding car for accelerating the rate of propagation of said wave through the train and thus more nearly sumultaneously initiating a release of brakes on the cars throughout the train.

According to the first embodiment of the invention, the service valve device 11 of the brake controlling valve device 2 on each car responds to an increase in brake pipe pressure for supplying fluid under pressure from a local source of such fluid, such as the emergency reservoir 6, to the brake pipe 1 on said car via a choke 54, which so controls the rate of such supply as to effect a local boost in brake pipe pressure of a chosen limited degree within the period of time that the emergency reservoir is open to the brake pipe, which period is controlled by the rate at which brake cylinder pressure is released via the brake cylinder release choke 46.

According to the second embodiment of the invention, the service valve device 11 on each car responds to an increase in brake pipe pressure for causing a metered volume of fluid under pressure to be dumped from the volume 53 into the brake pipe 1 for effecting a local boost in brake pipe pressure, said volume 53 being charged by way of a trickle choke 54 from a source of fluid under pressure, such as the emergency reservoir 6, so that after fluid under pressure from the volume 53 is dumped into the brake pipe, no appreciable further increase in brake pipe pressure will be effected during the period of time that the volume 53 is open to the brake pipe, which period is similarly controlled by the rate at which brake cylinder pressure is released via the brake cylinder release choke 46.

Having now described the invention, what we claim as new and desire to secure by Letters Patent, is:

1. In a fluid pressure brake apparatus, the combination with a brake pipe, an auxiliary reservoir, a control reservoir, and a brake cylinder device, of a local volume for storing a limited quantity of fluid under pressure, and a service valve device comprising valve means and a plurality of spaced coaxially arranged movable abutments for controlling operation of said valve means, said valve means being operative in response to a decrease in brake pipe pressure relative to a datum pressure in said control reservoir to supply fluid under pressure from said auxiliary reservoir to said brake cylinder device for effecting an application of brakes, said valve means being operative in response to a subsequent increase in brake pipe pressure to connect said volume to said brake pipe for locally boosting brake pipe pressure and to concurrently connect said brake cylinder device to atmosphere for releasing brakes, and said valve means being operative in response to a consequent reduction in brake cylinder pressure of a certain degree for disconnecting said volume from said brake pipe while continuing to release fluid under pressure from said brake cylinder device a further degree corresponding to the degree of increase in brake pipe pressure.

2. In a fluid pressure brake apparatus, the combination with a brake pipe, an auxiliary reservoir, a control reservoir, and a brake cylinder device, of a local source of fluid under pressure, valve means, and a plurality of spaced coaxially arranged movable abutments controlling positioning of said valve means, said valve means being movable to one position in response to a decrease in brake pipe pressure relative to a datum pressure in said control reservoir to supply fluid under pressure from said auxiliary reservoir to said brake cylinder device for applying brakes and movable to another position in response to a subsequent increase in brake pipe pressure to connect said source to said brake pipe for locally boosting brake pipe pressure and to also connect said brake cylinder device to atmosphere for releasing brakes, said valve means being thereafter movable to a third position intermediate its said other and one positions in response to a certain degree of release of brake cylinder pressure to disconnect said source from said brake pipe and to permit continued release of brake cylinder pressure a further degree corresponding to the degree of increase in brake pipe pressure, and means interposed between said source and said valve means for controlling the degree of such boost in brake pipe pressure.

3. In a fluid pressure brake apparatus of the type comprising a brake pipe, fluid pressure operated brake applying means, and a control reservoir, the combination of a local source of fluid under pressure, and a valve device comprising a plurality of spaced coaxially arranged movable abutment means, valve means controlled by movement of said movable abutment means and normally connecting said brake pipe to a chamber, a first spring, and a second spring of greater value than said first spring, said movable abutment means having one position for causing said valve means to bottle up fluid under pressure in said brake applying means and movable therefrom to another position when the combined effect of fluid pressure in said chamber and brake applying means and action of said first spring exceeds the opposing effect of fluid pressure in said control reservoir and action of said second spring, said valve means being operative in said other position to disconnect said chamber from said brake pipe and connect said local source to said brake pipe for effecting a local boost in brake pipe pressure and concurrently releasing fluid pressure from said brake applying means, said movable abutment means being responsive to a consequent reduction in pressure in said brake applying means of a sufficient degree to move to a position intermediate said one and other positions for causing said valve means to disconnect said source from said brake pipe and reconnect the latter to said chamber and continue to release fluid under pressure from said brake applying means.

4. In a fluid pressure brake apparatus, in combination, a brake pipe, a control reservoir, a brake cylinder device, a local volume for storing fluid under pressure, and a valve device having a first chamber open to said brake cylinder device, a second chamber open to said control reservoir and a third chamber, said valve device comprising a spring and valve means controlled by fluid pressures in said chambers and pressure of said spring and adapted to assume one position for bottling up fluid pressure in said brake cylinder and opening said third chamber to said brake pipe when the combined effect of brake cylinder pressure in said first chamber and pressure in said third chamber and action of said spring equalizes with the opposing effect of control reservoir pressure in said second chamber, said valve means being operative responsively to a certain degree of increase in pressure in said third chamber to move to another position for disconnecting said third chamber from said brake pipe and connecting said volume to said brake pipe and also releasing fluid under pressure from said brake cylinder device and first chamber, and said valve means being operative responsively to a consequent reduction in brake cylinder pressure of a predetermined degree to move from said other position toward said one position to an intermediate position for successively disconnecting said volume from said brake pipe and then reconnecting said brake pipe with said third chamber and at the same time continuing to release brake cylinder pressure to a degree corresponding substantially to the degree of total increase in brake pipe pressure.

5. In a fluid pressure brake apparatus, in combination, a brake pipe, a control reservoir, a brake cylinder device, a local source of fluid under pressure, a valve device comprising two cooperatively connected movable abutments and valve means controlled by said movable abutments, said valve means having one position for bottling up fluid under pressure in said brake cylinder device and in which position said brake pipe is open to a certain chamber, and movable from said one position to another position in response to an increase in pressure in said certain chamber for disconnecting said brake pipe from said certain chamber and connecting said brake pipe to said source and also opening said brake cylinder device to atmosphere, said valve means being movable in the direction of said one position in response to a reduction in brake cylinder pressure of a certain degree for disconnecting said brake pipe from said source and then reconnecting said brake pipe to said certain chamber, and means interposed between said source and valve means for controlling the quantity of fluid under pressure supplied from said source to said brake pipe while said valve means is in said other position.

6. A fluid pressure brake apparatus comprising, in combination, a brake pipe, a control reservoir, an auxiliary reservoir, a brake cylinder device, an emergency reservoir, a communication connecting said emergency reservoir with said brake pipe, and a valve device comprising valve means and a plurality of spaced coaxially arranged movable abutments controlling operation of said valve means, said valve means being positively connected to one of said movable abutments and controlling said communication and responsive to a reduction in brake pipe pressure of down to a certain value below control reservoir pressure for supplying fluid under pressure from said auxiliary reservoir to said brake cylinder device and responsive to a reduction in brake pipe pressure to a value below said certain value for additionally supplying fluid under pressure to said brake cylinder device from said emergency reservoir while maintaining said communication closed, said valve means being responsive to an increase in brake pipe pressure for releasing fluid under pressure from said brake cylinder device and opening said communication, and said valve means being responsive to a consequent release of brake cylinder pressure to a certain degree for closing said communication while continuing to release brake cylinder pressure to a value corresponding to the value of brake pipe pressure.

7. In a fluid pressure brake apparatus, in combination, a brake pipe, a local source of fluid under pressure, a control reservoir, a slide valve and a plurality of movable abutments controlling operation of said slide valve and controlled by constant pressure of fluid in said control reservoir acting in opposition to pressure of fluid in said brake pipe plus pressure of fluid in said brake cylinder device, said slide valve being operative upon a reduction in brake pipe pressure to supply fluid to said brake cylinder device at a pressure corresponding to the reduction in brake pipe pressure, and operative upon an increase in brake pipe pressure at one rate to one position and at a faster rate to a second position and operative in both said one and second positions to establish a fluid pressure release communication from said brake cylinder device and operative upon a reduction in brake cylinder pressure corresponding to the increase in brake pipe pressure to a lap position for bottling up fluid under pressure in said brake cylinder device, said slide valve in said second position establishing a communication for flow of fluid under pressure from said source of fluid under pressure to said brake pipe and closing such communication in all other positions, and means for so controlling rate of release of fluid under pressure from said brake cylinder device relative to increase in brake pipe pressure in said second position as to cause operation of said movable abutments to cause movement of said slide valve to said one position to terminate increase in brake pipe pressure as effected by supply of fluid under pressure from said source to said brake pipe.

8. A fluid pressure brake apparatus comprising, in combination, a brake pipe, a brake cylinder device, a local volume for storing fluid under pressure, and a service valve device comprising two coaxially arranged movable abutments of different areas and a slide valve interposed between said movable abutments, said movable abutments being operable as a stack for controlling positioning of said slide valve, the smaller of said movable abutments being subject at its side adjacent said slide valve to atmospheric pressure and at the opposite side to brake cylinder pressure, and the larger of said movable abutments being subject at its side adjacent said slide valve to pressure of fluid in a chamber normally open to said brake pipe and at the opposite side to a control pressure corresponding to a normal full charge value of brake pipe pressure, said stack being responsive to a reduction in brake pipe pressure below said control pressure for shifting said slide valve to one position for supplying fluid under pressure to said brake cylinder device and responsive to a certain degree of subsequent increase in pressure in said chamber to shift said slide valve to another position for disconnecting said chamber from said brake pipe and supplying fluid under pressure from said volume to said brake pipe and also releasing fluid under pressure from said brake cylinder device, said stack being responsive to a consequent reduction in brake cylinder pressure of a predetermined degree to shift said slide valve to a position intermediate said other and one positions for disconnecting said volume from said brake pipe and reconnecting the latter to said chamber and at the same time continuing to release brake cylinder pressure to a degree corresponding substantially to the degree of total increase in brake pipe pressure.

References Cited in the file of this patent

UNITED STATES PATENTS

| | | |
|---|---|---|
| 715,088 | Krimmelbein | Dec. 2, 1902 |
| 902,162 | Normand | Oct. 27, 1908 |
| 965,616 | Turner | July 26, 1910 |
| 1,879,643 | Thomas | Sept. 27, 1932 |
| 1,890,087 | Kasantzeff | Dec. 6, 1932 |
| 2,048,327 | Farmer | July 21, 1936 |
| 2,215,347 | Cook et al. | Sept. 17, 1940 |

FOREIGN PATENTS

| | | |
|---|---|---|
| 605,781 | Great Britain | July 30, 1948 |